Feb. 16, 1932.　　　A. S. MARCHUS　　　1,845,922
AIR HOSE CONNECTION
Filed Jan. 29, 1930
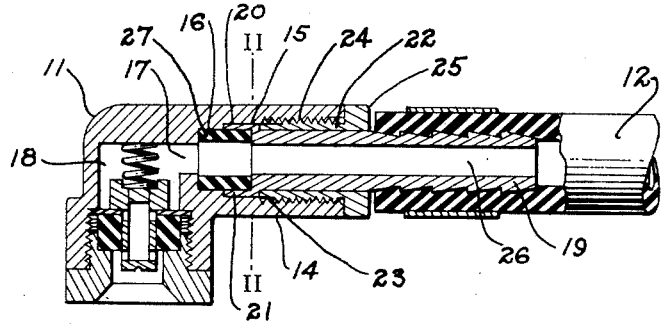
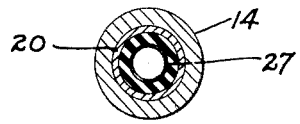
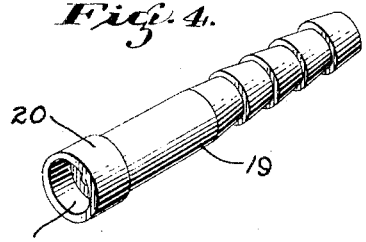
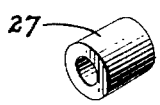
INVENTOR.
Amos S. Marchus
BY
Townsend, Loftus & Abbett
ATTORNEYS.

Patented Feb. 16, 1932

1,845,922

UNITED STATES PATENT OFFICE

AMOS S. MARCHUS, OF OAKLAND, CALIFORNIA

AIR HOSE CONNECTION

Application filed January 29, 1930. Serial No. 424,220.

This invention relates to air hose connections used in connection with air delivery devices at automobile service stations for inflating and testing pneumatic tires.

It is the principal object of the present invention to provide an improved swivel connection between an air nozzle fitting and a hose to enable the same to be relatively rotated without permitting the leakage of air therebetween.

In carrying the invention into practice I provide a nozzle fitting having a counterbore therein. A hollow spindle projects into the fitting and is formed with a bore complemental to the counterbore. The hose is attached to this hollow spindle. To prevent leakage between the spindle and the fitting I provide an expansible member fitting within the counterbore of the fitting and the bore of the spindle. This member is expanded by the air pressure in the fitting to maintain an air tight seal between the fitting and the spindle while permitting the same to relatively rotate.

One form which the invention may assume is exemplified in the following description and illustrated by way of example in the accompanying drawings, in which:

Fig. 1 is an enlarged view in central longitudinal section through a device embodying the preferred form of my invention.

Fig. 2 is a transverse section therethrough taken on line II—II of Fig. 1.

Fig. 3 is a perspective view of the expansible sleeve.

Fig. 4 is a perspective view of the spindle.

Referring more particularly to the accompanying drawings, I show a tire valve actuator fitting 11 and an air hose 12 to which it is connected. The present invention is particularly concerned in so connecting these two elements that they may rotate relative to each other without permitting a leakage of air at their junction.

To accomplish this the fitting 11 is formed with a cylindrical portion or barrel 14 which is formed with a longitudinal bore 15 terminating at its inner end in a counterbore 16. This counterbore 16 is just slightly less than the main bore 15. An air duct 17 communicates with the counterbore 16 and is arranged concentric thereto as illustrated. This air duct 17, of course, communicates with a valve chamber 18 in the end of the fitting 11. The duct 17 permits air to pass from the valve chamber to the hose or vice versa depending upon the operation of the gage structure to which the fitting is connected.

Rotatably connected with the barrel 14 of the fitting 11 is a spindle 19. The inner end of this spindle is enlarged as at 20 so as to rotatably fit within the main bore 15 of the barrel 14. This end of the spindle is formed with a counterbore 21 of the same diameter and depth as the counterbore 16 in the barrel. The inner end of the spindle 19 abuts against the annular shoulder which is formed between the main bore 15 and the counterbore 16 as illustrated.

To rotatably maintain the spindle 19 in this position I provide a bushing or retainer 22 having a cylindrical portion 23. This retainer 22 is bored to a diameter rotatably receiving the cylindrical body portion of the spindle 19. The outer diameter of the retainer 22 is such that it may be inserted in the main bore 15 of the barrel 14 and abut against the annular shoulder on the spindle formed between the enlarged inner end thereof and the body portion. The retainer 22 is formed with threads 24 at its outer end which are adapted to engage similar threads formed in the outer end of the main bore 15.

Thus, it is apparent that the spindle 19 is rotatably collared in the main bore 15 of the barrel 14 between the retainer 22 and the shoulder intermediate the main bore 15 and the counterbore 16 of the barrel 14.

The outer extremity of the retainer 22 is formed with a hexagon nut 25 by means of which it may be manipulated to connect it with the barrel or disconnect it therefrom.

The outer end of the spindle 19 projects a considerable distance beyond the end of the barrel as illustrated and is formed with circumferential serrations. The outer diameter of this portion of the spindle 19 is greater than the inner diameter of the hose 12 into which it is to be inserted so that the serrations on the spindle 19 will be tightly embedded in the inner periphery of the hose so as to prevent the leakage of air therebetween.

It will be noticed that the spindle 19 is formed with a longitudinal or concentrically arranged air duct or passageway 26 which forms a communication between the counterbore 21 in the spindle and the interior of the hose 12.

In order to prevent air leakage at the junction between the counterbore 16 in the barrel 14 and the counterbore 21 in the spindle 19 I provide an expansible sleeve 27. This sleeve is of an outer diameter agreeing with the diameter of the counterbores 16 and 21 and is of a length agreeing with the combined depths of the counterbores 16 and 21. The expansible sleeve 27 is arranged within these counterbores as illustrated. The inner diameter of the sleeve 27 is greater than the diameter of the air ducts 17 and 26. When air pressure is passing through the ducts 26 and 17 the pressure causes the expansible sleeve 27 to tightly contact with the peripheries of the counterbores 16 and 21 and to prevent leakage of air therebetween. This prevents leakage of air at the junction between the spindle and the barrel but at the same time permits relative rotation between the spindle and the fitting 11.

In operation of the device it is constructed and assembled as illustrated in the drawings and an air hose 12 is connected with the projecting end of the spindle. The fitting 11 is engaged with the valve stem of a tire and the valve in the fitting 11 depresses the tire valve stem so as to open the same and at the same time open the valve in the fitting, thus establishing communication between the air hose and the interior of the tire. The air pressure thereof passes through the passageways 26 and 17 and the pressure thereof causes the expansible sleeve 27 to be expanded to form an air tight joint between the spindle and the fitting.

The manner in which the spindle is connected with the fitting 11 enables relative rotation between the fitting 11 and the spindle. This is important in an air connection of the type here disclosed as it enables the fitting 11 to be disposed in any position to properly engage the tire thereof without twisting the hose 12.

From the foregoing it is obvious that I have provided an improved swivel connection between an air hose and an air fitting and while I have shown the preferred form of my invention it is to be understood that various changes may be made in its construction by those skilled in the art without departing from the spirit of the invention as defined in the appended claims.

Having thus described my invention, what I claim and desire to secure by Letters Patent is:

1. A device of the character described comprising a fitting including a cylindrical portion, said cylindrical portion having a main bore extending inwardly from the end thereof, said cylindrical portion having a counterbore of a diameter less than the diameter of the main bore and extending from the inner end of the main bore, a tubular member adapted to be connected at one end to a hose, the other end of said tubular member projecting within the main bore in a position with its end closely contiguous to the outer end of counterbore, means connecting said tubular member to said fitting to positively hold the same from axial movement but permitting relative rotation between it and the fitting, the inner end of said member being formed with a bore complemental to the counterbore, an expansible sleeve tightly fitting the bore in said tubular member and the counterbore, said expansible sleeve being adapted to be radially expanded by air pressure passing through the fitting and through said tubular member whereby to prevent the leakage of air around said tubular member from between the ends of the tubular member and the counterbore.

2. A swivel joint for the delivery end of an air hose including a member having a right angular portion at one end enclosing a valve chamber and a main bore extending inwardly from the other end thereof, said member being formed with a counterbore of reduced diameter concentric to the main bore and extending inwardly from the inner end thereof, an air duct extending concentrically from the inner end of the counterbore, a spindle adapted to be connected at one end to a conduit, the other end of said spindle being of a diameter agreeing with the diameter of the main bore and being projected therein in abutting relation to the end of the main bore and contiguous to the counterbore, means for maintaining a connection between the spindle and said member whereby the spindle is prevented from axial movement but free to revolve relative to the member, the inner end of said spindle being formed with a bore of same diameter as the counterbore, said spindle having an air duct formed longitudinally therethrough, a radially expansible sleeve of an exterior diameter agreeing with the diameter of the counterbore in the member and the bore in the spindle and being arranged therein, the length of said sleeve agreeing with the combined lengths of the counterbore in the member and the bore in the end of the spindle, the inner diameter of the sleeve being greater than the diameter of the air passage extending from the counterbore and the duct extending through the spindle whereby air pressure passing through the spindle and member will cause expansion of said sleeve and create a seal to prevent the leakage of air around the periphery of the spindle.

3. A swivel connection for the delivery end of an air hose comprising a fitting body having a bore therein, a restricted portion at the inner end of said bore, a spindle rotatably mounted in the bore, an enlarged portion on the end of said spindle, said restricted portion and said enlarged portion being coaxial and abutting and having equal interior diameters, and a retaining gland between the fitting body and the spindle and engaging the enlarged portion of the spindle to maintain it in abutment with the restricted portion of the bore, and a radially expansible rubber sleeve fitting the restricted portion of the bore and the interior of the enlarged portion and adapted to be expanded by air pressure passing through the spindle to prevent leakage between the abutting ends of the enlarged portion of the spindle and restricted portion of the said bore.

4. A swivel connection for the delivery end of an air hose comprising a fitting body having a bore therein, a restricted portion at the inner end of said bore, a spindle rotatably mounted in the bore, an enlarged portion on the end of said spindle, said restricted portion and said enlarged portion being coaxial and abutting and having equal interior diameters, an expansible ring within said portions forming an air seal between them, and a retaining gland between the fitting body and the spindle and engaging the enlarged portion of the spindle to maintain it in abutment with the restricted portion of the bore.

AMOS S. MARCHUS.